(12) United States Patent
Banaszek

(10) Patent No.: US 10,085,389 B1
(45) Date of Patent: Oct. 2, 2018

(54) MODULAR PLANT SUPPORT SYSTEM

(71) Applicant: Brenda Banaszek, Wilkes Barre, PA (US)

(72) Inventor: Brenda Banaszek, Wilkes Barre, PA (US)

(*) Notice: Subject to any disclaimer, the term of this patent is extended or adjusted under 35 U.S.C. 154(b) by 144 days.

(21) Appl. No.: 15/144,975

(22) Filed: May 3, 2016

(51) Int. Cl.
*A01G 9/12* (2006.01)
*A01G 17/06* (2006.01)

(52) U.S. Cl.
CPC .................... *A01G 17/06* (2013.01)

(58) Field of Classification Search
CPC .......... A01G 9/12; A01G 9/122; A01G 17/06; A01G 17/10; A01G 17/14
USPC ................................. 47/42–47, 70
See application file for complete search history.

(56) References Cited

U.S. PATENT DOCUMENTS

| | | | | |
|---|---|---|---|---|
| 3,638,814 A * | 2/1972 | Lowery | ................ | A47B 47/027 211/189 |
| 4,005,548 A * | 2/1977 | Nahon | ................ | A01G 9/12 182/180.1 |
| 4,165,582 A * | 8/1979 | Skaug | ................ | A01G 17/06 47/44 |
| 4,642,940 A * | 2/1987 | Ettema | ................ | A01G 17/14 47/44 |
| D292,475 S | 10/1987 | Kitchen | | |
| 4,881,342 A * | 11/1989 | Ferguson | ................ | A01G 9/128 248/125.1 |
| D331,526 S | 12/1992 | Miller | | |
| 5,252,072 A * | 10/1993 | Sasaki | ................ | A01G 9/12 248/156 |
| 2,107,989 A | 1/1995 | Menchetti | | |
| 6,000,172 A * | 12/1999 | Ballarino | ................ | A01G 17/06 47/47 |
| 6,925,754 B1 * | 8/2005 | Tearoe | ................ | A01G 9/12 172/371 |
| 7,331,140 B1 * | 2/2008 | Mason | ................ | A01G 9/122 47/47 |
| 8,322,071 B1 | 12/2012 | Spero | | |
| 2002/0112400 A1 * | 8/2002 | Fidler | ................ | A01G 17/06 47/46 |
| 2003/0205647 A1 * | 11/2003 | Boucher | ................ | A01G 9/122 248/156 |
| 2004/0068925 A1 * | 4/2004 | Puspurs | ................ | A01G 9/12 47/45 |

(Continued)

FOREIGN PATENT DOCUMENTS

EP 0979601 A1 2/2000
FR 2987970 A1 * 9/2013 ............... A01G 9/12

*Primary Examiner* — David J Parsley
*Assistant Examiner* — Danielle A Clerkley

(57) ABSTRACT

The modular plant support system is a modular trestle system adapted for use in horticulture. The modular plant support system comprises a plurality of stakes, a plurality of ties, and one or more interstake connectors. Each of the plurality of stakes further comprises a first plurality of hooks that provide vining and other growing plants climbing purchase points that allow plants to grow in a manner that optimizes exposure to sunlight and therefore plant yields. Each of the plurality of ties is a cord that is formed with a series of knobs that allows the plant to be secured to an individual stake without damaging the plant or constraining the growth path of the plant. Each of the one or more interstake connectors provides climbing purchases that allow a plant to expand in directions other than the vertical direction.

5 Claims, 5 Drawing Sheets

(56) References Cited

U.S. PATENT DOCUMENTS

| | | | |
|---|---|---|---|
| 2006/0022066 A1* | 2/2006 | Jerstad | A01G 9/12 239/276 |
| 2006/0053689 A1* | 3/2006 | Smith | A01G 9/12 47/45 |
| 2009/0272032 A1* | 11/2009 | Kiff, Sr. | A01G 9/124 47/70 |
| 2010/0005714 A1* | 1/2010 | Aiken | A01G 9/122 47/47 |
| 2010/0043284 A1* | 2/2010 | Smith | A01G 9/122 47/70 |
| 2012/0000124 A1 | 1/2012 | Posa | |
| 2012/0017501 A1 | 1/2012 | Koopmeiners | |
| 2013/0000187 A1* | 1/2013 | Raisacher | A01G 17/14 47/46 |
| 2015/0033623 A1 | 2/2015 | Mauro | |
| 2015/0187235 A1 | 7/2015 | Zinnbauer | |

* cited by examiner

MODULAR PLANT SUPPORT SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of forcing structures for use in agriculture and horticulture, more specifically, a support for plants and a method of fixing plants to the support said support.

SUMMARY OF INVENTION

The modular plant support system is a modular trestle system adapted for use in horticulture. The modular plant support system comprises a plurality of stakes, a plurality of ties, and one or more interstake connectors. Each of the plurality of stakes further comprises a first plurality of hooks that provide vining and other growing plants climbing purchase points that allow plants to grow in a manner that optimizes exposure to sunlight and therefore plant yields. Each of the plurality of ties is a cord that is formed with a series of knobs that allows the plant to be secured to an individual stake without damaging the plant or constraining the growth path of the plant. Each of the one or more interstake connectors provides climbing purchases that allow a plant to expand in directions other than the vertical direction.

These together with additional objects, features and advantages of the modular plant support system will be readily apparent to those of ordinary skill in the art upon reading the following detailed description of the presently preferred, but nonetheless illustrative, embodiments when taken in conjunction with the accompanying drawings.

In this respect, before explaining the current embodiments of the modular plant support system in detail, it is to be understood that the modular plant support system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the modular plant support system.

It is therefore important that the claims be regarded as including such equivalent construction insofar as they do not depart from the spirit and scope of the modular plant support system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
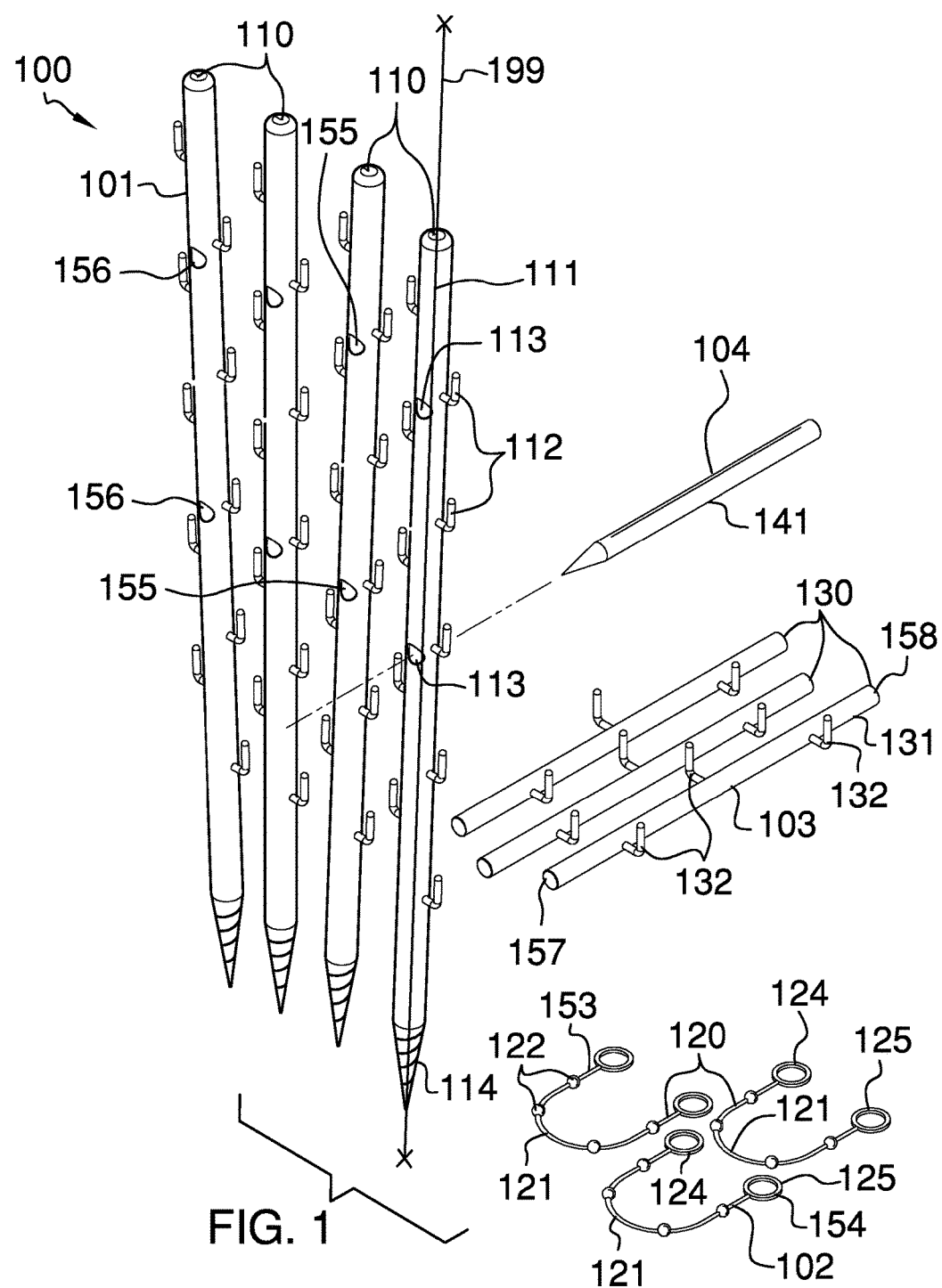
FIG. 1 is a perspective view of an embodiment of the disclosure.
Figure 2:
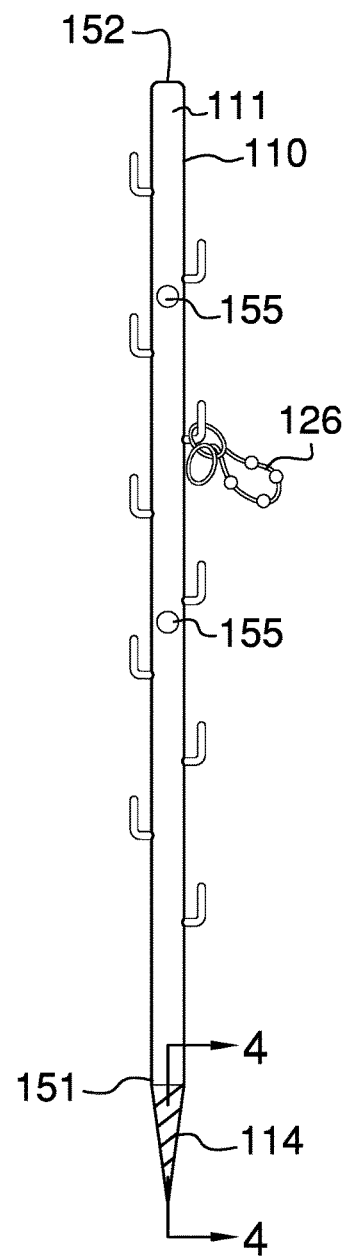
FIG. 2 is a front view of an embodiment of the disclosure.
Figure 3:
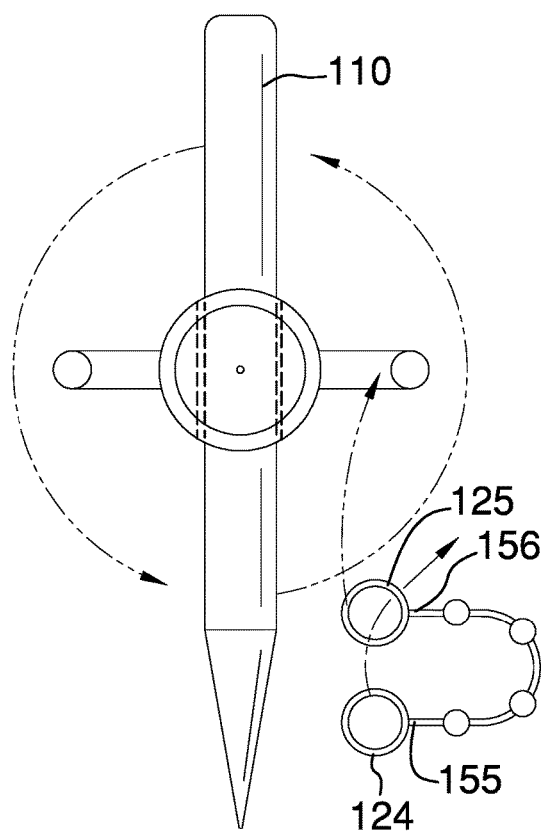
FIG. 3 is a top view of an embodiment of the disclosure.
Figure 4:
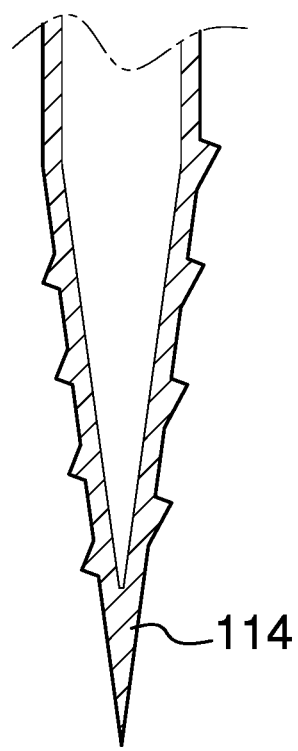
FIG. 4 is a cross-sectional view of an embodiment of the disclosure across 4-4 as shown in FIG. 2.
Figure 5:
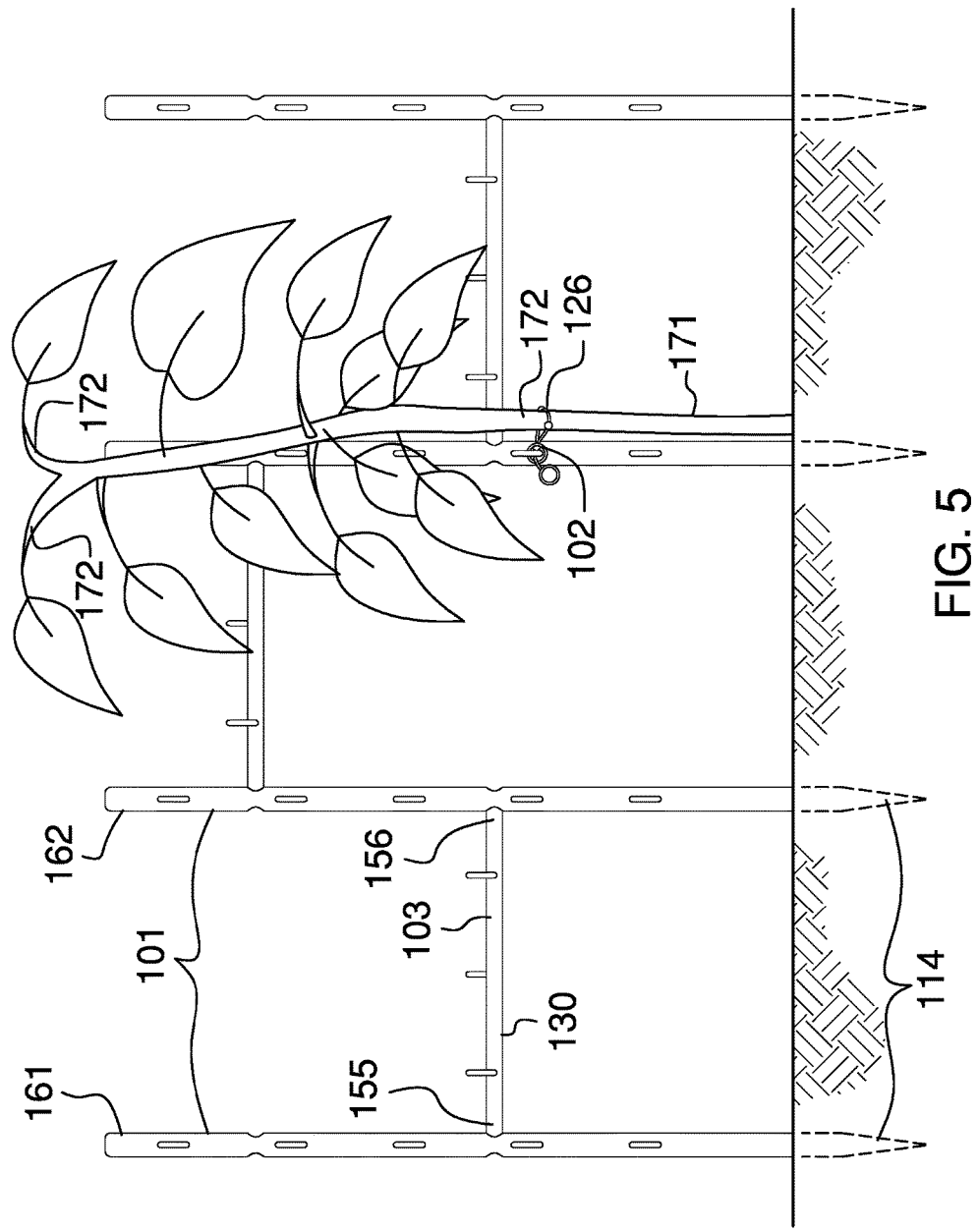
FIG. 5 is an in use view of an embodiment of the disclosure.
Figure 6:
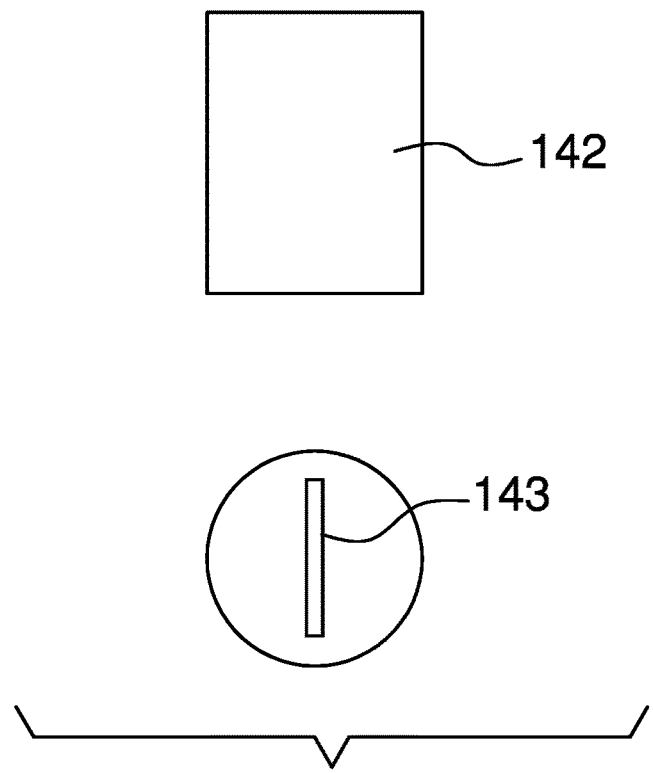
FIG. 6 is a detail view of an embodiment of the disclosure.
Figure 7:
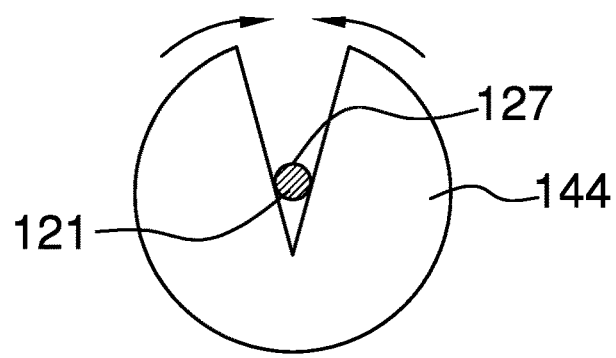
FIG. 7 is a detail view of an embodiment of the disclosure.

Detailed reference will now be made to one or more potential embodiments of the disclosure, which are illustrated in FIGS. 1 through 7.

The modular plant support system 100 (hereinafter invention) comprises a plurality of stakes 101, a plurality of ties 102, and one or more interstake connectors 103. The invention 100 is a modular trestle system adapted for use in horticulture. Each of the plurality of stakes 101 further comprises a first plurality of hooks 112 that provide vining and other growing plants 171 climbing purchase points that allow plants 171 to grow in a manner that optimizes their exposure to sunlight and therefore plant 171 yields. Each of the plurality of ties 102 is a cord 121 that is formed with a series of knobs that allows the plant 171 to be secured to an individual stake 110 without damaging the plant 171 or constraining the growth path of the plant 171. Each of the one or more interstake connectors 103 are used to connect a first individual stake 161 to a second individual stake 162 which provides climbing purchases that allow a plant 171 to expand in directions other than the vertical direction.

The plurality of stakes 101 comprises a collection of individual stakes 110. Each individual stake 110 further comprises a first shaft 111, a first plurality of hooks 112, one or more first apertures 113, and an auger 114. The first shaft 111 is further defined with a first end 151 and a second end 152. The first shaft 111 is a pipe. The first end 151 of the first shaft 111 is formed or fitted with the auger 114. The auger 114 is a cone shaped device that is formed with an exterior screw thread. The exterior screw thread allows the first end 151 of the first shaft 111 to be bored into the ground such that first shaft 111 will be self-standing as it projects out of the ground—much like a fencepost. Each of the one or more first apertures 113 is an opening formed in the first shaft 111 that is sized to receive an individual interstake connector 130 selected from the one or more interstake connectors 103. Each first aperture selected from the one or more first apertures 113 further comprises a first hole 155 and a second hole 156. The first hole 155 is a circular opening that is formed in the face of the cylinder of the first shaft 111. The second hole 156 is a circular opening that is formed in the face of the cylinder of the first shaft 111 such that a line drawn from the center of the first hole 155 to the center of the second hole 156 will pass perpendicularly through a center axis 199 of the first shaft 111.

The difference between the span of the diameter of the first hole 155 and the span of the diameter of the second hole 156 is within manufacturing tolerances. The span of the inner diameter of the first hole 155 is lesser than the span of the outer diameter of each of the one or more interstake connectors 103 thus allowing each of the one or more interstake connectors 103 to be inserted into the first hole 155. The span of the inner diameter of the second hole 156 is lesser than the span of the outer diameter of each of the one or more interstake connectors 103 thus allowing each of the one or more interstake connectors 103 to be inserted into the first hole 155. The one or more interstake connectors 103 are discussed in detail elsewhere in this disclosure. Each of the first plurality of hooks 112 is a curved, or bent, shaft that is attached to the first shaft 111 such that each of the first plurality of hooks 112 projects away from the center axis of the first shaft 111. Each hook selected from the first plurality of hooks 112 is bent such that an individual tie 120 selected from the plurality of ties 102 can be hung from the selected hook. Similarly, the vine or branch 172 of a plant 171 may be hung from the selected hook.

The plurality of ties 102 comprises a collection of individual ties 120. Each of the individual ties 120 comprises a cord 121 and a plurality of knobs 122. The cord 121 is a flexible string, wire, or other line that is further defined with a third end 153 and a fourth end 154. The cord 121 further comprises a first loop 124 and a second loop 125. The first loop 124 is a loop that is formed on the third end 153 of the cord 121. The second loop 125 is a loop that is formed on the fourth end 154 of the cord 121. The first loop 124 can be a commercially available ring that is attached to the third end 153 or the first loop 124 can be an end loop knot that is tied into the third end 153. The second loop 125 can be a commercially available ring that is attached to the fourth end 154 or the second loop 125 can be an end loop knot that is tied into the fourth end 154. The first loop 124 and the second loop 125 are formed such that the first loop 124 can be inserted through the second loop 125 to form a third loop 126. To attach an individual tie 120 to a vine or branch 172 of a plant 171, the first loop 124 is inserted through the second loop 125 such that the vine or branch 172 of a plant 171 runs through the third loop 126. The vine or branch 172 of the plant 171 is attached to an individual stake 110 by hanging the first loop 124 on a hook selected from the first plurality of hooks 112. The bight of the cord 121 is fitted with the plurality of knobs 122.

Each of the plurality of knobs 122 is a globe like structure that is used to: 1) provide climbing purchase for the plant 171; and, 2) to act as a physical barricade that prevents the third loop 126 from being tightened to the point where the third loop 126 will damage the plant 171. Each knob selected from plurality of knobs 122 can be a stopper knot that is tied directly into the bight of the cord 121. Alternatively, each knob selected from the plurality of knobs 122 can be a commercially available fishing weight that is fitted with a second aperture 127 allows the bight to be threaded through each of the selected knobs. Suitable fishing weights include, but are not limited to, commercially available split shot weights 144 or commercially available barrel weights.

The one or more interstake connectors 103 comprise a collection of at least one individual interstake connector 130. Each of the individual interstake connectors 130 comprises a second shaft 131 and a second plurality of hooks 132. Each of the individual interstake connectors 130 further comprises a fifth end 157 and a sixth end 158. The second shaft 131 is a pipe. The outer diameter of the second shaft 131 is selected such that the second shaft 131 will fit into an aperture selected from the one or more first apertures 113. Each of the second plurality of hooks 132 is a curved, or bent, shaft that is attached to the second shaft 131 such that each of the second plurality of hooks 132 projects away from the center axis of the second shaft 131. Each hook selected from the second plurality of hooks 132 is bent such that an individual tie 120 selected from the plurality of ties 102 can be hung from the selected hook. Similarly, the vine or branch 172 of a plant 171 may be hung from the selected hook.

In a first potential embodiment of the disclosure, the invention 100 further comprises a handle 104. The handle 104 is a third shaft 141 with an outer diameter that is lesser than the inner diameter of each of the one or more first apertures 113. As shown most clearly in FIG. 3, handle 104 is inserted through an aperture selected from the one or more first apertures 113 such that the handle 104 can be used as a grip, which provides leverage in drilling the auger 114 into the ground.

In a second potential embodiment of the disclosure, the invention 100 further comprises an end cap 142. The end cap 142 is a cylindrical structure that is attached to the second end 152 of a first shaft 111. An end of the end cap 142 is formed with a slot 143 that is sized to receive the screwdriver bit of a power drill. When an end cap 142 is attached to the first shaft 111 in this manner, the slot 143 allows a power drill to rotate the individual stake 110 which can then be used to drive the auger 114 into the ground.

To use the invention 100, each of the individual stakes 110 is driven into the ground using the auger 114. Each of the individual stakes 110 are interconnected by: 1) inserting the fifth end 157 of an individual interstake connector 130 into an aperture selected from the one or more first apertures 113 of a first individual stake 161 selected from the plurality of stakes 101; and by, 2) inserting the sixth end 158 of an individual interstake connector 130 into an aperture selected from the one or more first apertures 113 of a second individual stake 162 selected from the plurality of stakes 101. The interconnection between the individual interstake connector 130, the first individual stake 161, and the second individual stake 162 allows for the removal of the individual interstake connector 130 and for the disassembly of the invention 100.

The following definitions were used in this disclosure:

Auger: As used in this disclosure, an auger is a tool with a helical or screw type bit that is used for boring holes in objects.

Bight: As used in this disclosure, a bight refers to any central location on a rope or line.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Center Axis: As used in this disclosure, the center axis is the axis of a cylinder or cone like structure. When the center axes of two-cylinder or like structures share the same line they are said to be aligned. When the center axes of two-cylinder like structures do not share the same line they are said to be offset.

Cord: As used in this disclosure, a cord is a long, thin, and flexible piece of string, line, or rope. Cords are made from yarns, piles, or strands of material that are braided or twisted together or from a monofilament (such as fishing line). Cords have tensile strength but are too flexible to provide compressive strength and are not suitable for use in pushing objects. String, line, and rope are synonyms for cord.

Cylinder: As used in this disclosure, a cylinder is a geometric structure defined by two identical flat and parallel ends, also commonly referred to as bases, which are circular in shape and connected with a single curved surface wherein when the cross section of the cylinder remains the same from one end to another. The axis of the cylinder is formed by the straight line that connects the center of each of the two identical flat and parallel ends of the cylinder. In this disclosure, the term cylinder specifically means a right cylinder, which is defined as a cylinder wherein the curved surface perpendicularly intersects with the two identical flat and parallel ends.

Diameter: As used in this disclosure, a diameter of an object is a straight line segment that passes through the center of an object. The line segment of the diameter is terminated at the perimeter or boundary of the object through which the line segment of the diameter runs.

Exterior Screw Thread: An exterior screw thread is a ridge wrapped around the outer surface of a tube in the form of a helical structure that is used to convert rotational movement into linear movement.

Helix: As used in this disclosure, a helix is the three dimensional structure that would be formed by a wire that is wound uniformly around the surface of a cylinder or a cone. If the wire is wrapped around a cylinder the helix is called a cylindrical helix. If the wire is wrapped around a cone, the helix is called a conical helix. A synonym for conical helix would be a volute.

Hook: As used in this disclosure, a hook is an object that is curved or bent at an angle such that items can be hung on or caught by the object.

Inner Diameter: As used in this disclosure, the term inner diameter is used in the same way that a plumber would refer to the inner diameter of a pipe.

Knot: As used in this disclosure, a knot is an interlacement of cord, ribbon, rope, or similar materials that is used to: 1) secure the cord, ribbon, rope, or other similar material to an object which may include, but is not limited to, a second cord, ribbon, rope, or other similar material; or, 2) prevent the cord, ribbon, rope, or other similar material from being pulled through a hole or out of a retaining device. In this disclosure, the second type of knot is referred to as a stopper knot.

Outer Diameter: As used in this disclosure, the term outer diameter is used in the same way that a plumber would refer to the outer diameter of a pipe.

Pipe: As used in this disclosure, a pipe is a hollow cylindrical device that is used for transporting liquids and gasses. The line that connects the center of the first base of the cylinder to the center of the second base of the cylinder is referred to as the axis of the cylinder or the centerline of the pipe. When two pipes share the same centerline they are said to be aligned. In this disclosure, the terms inner diameter of a pipe and outer diameter are used as they would be used by those skilled in the plumbing arts.

Shaft: As used in this disclosure, the term shaft is used to describe a rigid cylinder that is often used as the handle of a tool or implement. The definition of shaft explicitly includes solid shafts or shafts that are formed more like pipes with a hollow passage through the shaft that runs along the center axis of the shaft cylinder.

With respect to the above description, it is to be realized that the optimum dimensional relationship for the various components of the invention described above and in FIGS. 1 through 7, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A modular trellis comprising:
   a plurality of stakes, a plurality of ties, and one or more interstake connectors;
   wherein the modular trellis is adapted for use in horticulture;
   wherein the modular trellis is adapted for use with one or more plants;
   wherein the modular trellis provides a plurality of purchase points that are adapted to be used by the one or more plants;
   wherein each individual stake selected from the plurality of stakes is a free standing structure that is bored into the ground;
   wherein an individual stake selected from the plurality of stakes using an individual tie selected from the plurality of ties is adapted to be attached to a plant selected from the one or more plants;
   wherein an individual interstake connector selected from the plurality of interstake connectors is used to interconnect a first individual stake selected from the plurality of stakes and a second individual stake selected from the plurality of stakes in a removable manner;
   wherein each individual stake selected from the plurality of stakes further comprises a first shaft, a first plurality of hooks, one or more first apertures, and an auger;
   wherein the first shaft is further defined with a first end and a second end;
   wherein the auger and the first plurality of hooks are attached to the first shaft;
   wherein the one or more first apertures are formed in the first shaft;
   wherein the first shaft is a pipe;
   wherein the auger is attached to the first end of the first shaft;
   wherein the auger is a cone shaped structure that is formed with an exterior screw thread;
   wherein each of the one or more first apertures is an opening formed through the first shaft;

wherein each of the one or more first apertures is sized to receive an individual interstake connector selected from the one or more interstake connectors;
wherein each first aperture selected from the one or more first apertures further comprises a first hole and a second hole;
wherein the first hole is a circular opening that is formed in a face of a cylinder of the first shaft;
wherein the second hole is a circular opening that is formed in the face of the cylinder of the first shaft such that a line drawn from the center of the first hole to the center of the second hole will pass perpendicularly through a center axis of the first shaft;
wherein the span of the inner diameter of the first hole is lesser than the span of the outer diameter of each of the one or more interstake connectors;
wherein the span of the inner diameter of the second hole is lesser than the span of the outer diameter of each of the one or more interstake connectors;
wherein each of the first plurality of hooks is a first rod that selected from the group consisting of a bent rod or a curved rod;
wherein each of the first plurality of hooks is attached to the first shaft such that each of the first plurality of hooks projects away from the center axis of the first shaft;
wherein each hook selected from the first plurality of hooks is formed such that an individual tie selected from the plurality of ties can be hung from the selected hook;
wherein each individual tie selected from the plurality of ties comprises a cord and a plurality of knobs;
wherein each of the plurality of knobs are formed on the cord;
wherein the cord is further defined with a first end and a second end;
wherein the cord comprises a first loop and a second loop;
wherein the first loop is a loop that is formed on the first end of the cord;
wherein the second loop is a loop that is formed on the second end of the cord;
wherein
wherein the first loop and the second loop are formed such that the first loop can be inserted through the second loop to form a third loop;
wherein to attach an individual tie to a vine or branch of a plant, the first loop is inserted through the second loop such that the vine or branch of the plant runs through the third loop;
wherein an individual stake is adapted to be attached to the vine or branch of the plant by hanging the first loop on a hook selected from the first plurality of hooks;
wherein the cord further comprises a bight;
wherein the bight of the cord is fitted with the plurality of knobs;
wherein the bight is threaded through a second aperture.

2. The modular trellis according to claim 1
wherein the one or more interstake connectors comprises a collection of at least one individual interstake connector;
wherein each of the individual interstake connectors comprises a second shaft and a second plurality of hooks;
wherein the second shaft is a pipe;
wherein each outer diameter of the second shaft is selected such that the second shaft will fit into an aperture selected from the one or more first apertures.

3. The modular trellis according to claim 2
wherein each of the second plurality of hooks is a second rod that selected from the group consisting of a bent rod or a curved rod;
wherein each of the second plurality of hooks is attached to the second shaft such that each of the second plurality of hooks projects away from a center axis of the second shaft;
wherein each hook selected from the second plurality of hooks is formed such that an individual tie selected from the plurality of ties can be hung from the selected hook.

4. The modular trellis according to claim 3
wherein the modular trellis further comprises a handle;
wherein the handle is a third shaft;
wherein the outer diameter of the third shaft is lesser than the inner diameter of each of the one or more first apertures;
wherein the handle is inserted through an aperture selected from the one or more first apertures.

5. The modular trellis according to claim 3
wherein the modular trellis further comprises an end cap;
wherein the end cap is a cylindrical structure that is attached to the second end of a first shaft;
wherein the end cap is formed with a slot.

* * * * *